US008631718B2

(12) United States Patent
Shimada

(10) Patent No.: US 8,631,718 B2
(45) Date of Patent: Jan. 21, 2014

(54) CAULKING COUPLING DEVICE, SWITCH AND TRANSMISSION SWITCH

(75) Inventor: Hiroyuki Shimada, Tokyo (JP)

(73) Assignee: Niles Co., Ltd., Tokyo (JP)

( * ) Notice: Subject to any disclaimer, the term of this patent is extended or adjusted under 35 U.S.C. 154(b) by 708 days.

(21) Appl. No.: 12/662,671

(22) Filed: Apr. 28, 2010

(65) Prior Publication Data

US 2010/0288612 A1 Nov. 18, 2010

(30) Foreign Application Priority Data

May 15, 2009 (JP) ................................ 2009-119278

(51) Int. Cl.

*F16H 59/08* (2006.01)
*B21D 39/02* (2006.01)
*H01H 9/02* (2006.01)

(52) U.S. Cl.

USPC ......... 74/473.12; 74/473.21; 74/527; 29/520; 403/265; 403/282

(58) Field of Classification Search

USPC ............... 74/473.21, 473.27, 473.28, 473.12, 74/527; 29/432, 505, 507, 512, 520, 29/522.1, 523; 403/265, 282

See application file for complete search history.

(56) References Cited

U.S. PATENT DOCUMENTS 6,491,440 B1 * 12/2002 Sahashi et al. ................ 384/544

FOREIGN PATENT DOCUMENTS

JP 2005-279650 10/2005

* cited by examiner

*Primary Examiner* — William C Joyce

(74) *Attorney, Agent, or Firm* — Rader, Fishman & Grauer PLLC

(57) ABSTRACT

A punch includes a first caulking surface and a second caulking surface caulking margins of which axially differ in depth and sequentially formed in a peripheral direction, and includes a regulating surface opposing an outer peripheral surface of a caulking process portion to the first caulking surface of the first and second caulking surfaces, which has a deeper caulking margin, wherein the regulating surface regulates radial fillet movement by caulking of the caulking process portion to promote the fillet movement to the second caulking surface of the first and second caulking surfaces, which has a less deep caulking margin.

2 Claims, 8 Drawing Sheets

CAULKING COUPLING DEVICE, SWITCH AND TRANSMISSION SWITCH

CROSS-REFERENCE TO RELATED APPLICATION

This application claims priority under 35 USC 119 from Japanese Patent Application No. 2009-119278, the disclosure of which is incorporated by reference herein.

BACKGROUND OF THE INVENTION

1. Field of the Invention

The present invention relates to a caulking coupling device, a switch, and a transmission switch provided for a caulking process of a transmission switch electrically detecting a gear shift position in an automatic transmission and the like.

2. Description of Related Art

For example, FIGS. 8 to 10 show a conventional transmission switch. FIG. 8 is a plan view showing a transmission switch for the conventional example, FIG. 9 is a side view of the same, FIG. 10A is an exploded perspective view showing a state before fitting of a cylindrical member and a detent plate, FIG. 10B is an exploded perspective view showing a state after the fitting, and FIG. 10C is an exploded perspective view showing a state after caulking coupling of the cylindrical member and the detent plate.

A transmission switch 101 is, as shown in FIGS. 8 to 10C, provided with a plastic terminal block 103 and a plastic moving block 105. The terminal block 103 is provided with a plurality of stationary contact points 107. The moving block 105 is provided with a plurality of movable contact points 109. The stationary contact points 107 and the movable contact points 109 constitute a contact point circuit for transmission gear shift.

A metallic cylindrical member 111 is rotatably supported by the moving block 105, and a metallic detent plate 113 is coupled to the cylindrical member 111 by caulking. A manual shaft (not shown) moving in cooperation with an operation of a shift lever is fixed in the cylindrical member 111.

The above caulking coupling is performed in the order of FIG. 10A, FIG. 10B and FIG. 10C. FIGS. 10A to 10C show conveniently also the terminal block 103 and the moving block 105 for easy understanding of the coupling relation between the metallic detent plate 113 and the cylindrical member 111.

As shown in FIG. 10A, the cylindrical member 111 is provided with width across flat portions 115 formed thereon and caulking process portions 117 on an outer periphery thereof. A drum-shaped bore portion 119 is formed in the detent plate 113.

As shown in FIG. 10B, the bore portion 119 of the detent plate 113 is fitted in the width across flat portions 115 of the cylindrical member 111 provided with the caulking process portions 117 on the outer periphery.

As shown in FIG. 10C, the caulking process portion 117 is caulked in an edge portion of the bore portion 119 with a predetermined caulking margin to form a caulking portion 121 to the detent plate 113, coupling the cylindrical member 111 to the detent plate 113 by caulking.

The above caulking process is executed by a punch as shown in FIG. 11 and FIG. 12. FIG. 11 is a perspective view showing the punch, FIG. 12A is a front view showing the punch, and FIG. 12B is a cross section taken in the direction of arrows on line XIIb-VIIb of FIG. 12A.

As shown in FIGS. 11 and 12, a punch 123 is formed in a cylindrical shape and has a fitting bore 125 formed in the center, which is fitted in the cylindrical member 111. Further, the punch 123 is provided with four caulking surfaces 129*a*, 129*b*, 129*c* and 129*d* formed in a tip end portion by four slits 127*a*, 127*b*, 127*c* and 127*d*. Each of the four caulking surfaces 129*a*, 129*b*, 129*c* and 129*d* is configured by a flat plane.

Such a punch 123 is used for a caulking coupling device as disclosed in Japanese Patent Laid-Open Publication No. 2005-279650 to caulk the caulking process portion 117 to the edge portion of the bore portion 119 with the set caulking margin to form the caulking portion 121 in FIG. 10C, thereby performing the caulking coupling.

Incidentally since the caulking process portion 117 is formed flatly, the fillet of the caulking process portion 117 crushed by the caulking margin is supposed to move radially outward of the cylindrical member 111.

When the caulking portion 121 spreads radially outward by this fillet movement, a peripheral length at the outermost peripheral portion is expanded so that the moved fillet is subjected to tensility in a peripheral direction, raising a problem that a crack tends to be generated at the outermost peripheral portion.

Particularly since the cylindrical member 111 requiring process precision is formed by cutting, a material exclusive to cutting (for example, SAE 1215 US standard) is used as the material of the cylindrical member 111, easily inviting the crack occurrence problem.

That is, since additives are used in the material exclusive to cutting for easy cutting, the cutting is easily performed but the crack tends to be easily generated by expansion of the material.

On the other hand, the caulking margin is made smaller (the caulking surface of the punch is made deeper) to increase the thickness of the caulking portion 121 and to reduce the fillet movement to the radial outward side, making it possible to prevent occurrence of the crack. As a result, however, there is a problem of weakening the caulking coupling force.

That is, the problem to be solved is in a point where since the caulking process portion is formed flatly, when the caulking margin is made smaller for crack occurrence prevention to increase the thickness of the caulking portion, the caulking coupling force is weakened.

In view of the above, there exists a need for a caulking coupling device, a switch, and a transmission switch which overcome the above mentioned problems in the conventional art. The present invention addresses this need in the conventional art as well as other needs, which will become apparent to those skilled in the art from this disclosure.

SUMMARY OF THE INVENTION

The present invention is made in view of the foregoing problem and the present invention has an object of providing a caulking coupling device, a switch, and a transmission switch which can maintain caulking strength as a whole and prevent occurrence of a crack by eliminating or restricting fillet movement of a caulking portion to a radially outward side.

For restricting crack occurrence while maintaining strength of caulking coupling, a caulking coupling device according to a first aspect of the present invention comprises:

a first member including a shaft-shaped fitting portion and provided with a caulking process portion on an outer periphery of the shaft-shaped fitting portion;

a second member having a bore portion fitted in the shaft-shaped fitting portion of the first member; and a punch having a caulking surface to the caulking process portion, wherein the caulking process portion is caulked to an edge portion of the bore portion with a predetermined caulking margin by the caulking surface of the punch to couple the first member to the second member by caulking, wherein:

the punch includes a first caulking surface and a second caulking surface as the caulking surface the caulking margins of which axially differ in depth and sequentially formed in a peripheral direction and includes a regulating surface opposing an outer peripheral surface of the caulking process portion to at least one of the first and second caulking surfaces, which has a deeper caulking margin, wherein the regulating surface regulates radial fillet movement by caulking of the caulking process portion to promote the fillet movement to the other of the first and second caulking surfaces, which has a less deep caulking margin.

In addition, a switch according to a second aspect of the present invention comprises:

a shaft provided with a caulking process portion on an outer periphery thereof; and a movable board having a bore portion fitted in the shaft, wherein the caulking process portion is caulked to an edge portion of the bore portion with a predetermined caulking margin to form a caulking portion to the movable board and to couple the shaft to the movable board by caulking, wherein:

the caulking portion is configured to sequentially provide a thin fillet portion an axial thickness of which is relatively thin and a thick fillet portion an axial thickness of which is relatively thick, in a peripheral direction of the shaft; and a radial length of the thin fillet portion is restricted to a predetermined length.

According to the caulking coupling device in the first aspect of the present invention, the regulating surface can regulate the radial fillet movement by the caulking of the caulking process portion to promote the fillet movement to the other of the first and second caulking surfaces, which has a less deep caulking margin, regulating the radial fillet spread of the thin fillet portion having the thickness of the caulking portion which is relatively thin.

Therefore, a caulking strength in the thin fillet portion of the caulking portion can be improved.

Further, since the thick fillet portion of the caulking portion accommodates the fillet movement from the thin fillet portion, the thick fillet portion is shallow in caulking margin but is in a state of being caulked with a caulking margin greater than a set caulking margin, and the caulking strength can be increased.

Accordingly, the caulking strength can be maintained as a whole and occurrence of a crack can be prevented or restricted by eliminating or restricting the fillet movement to a radially outward side.

According to the switch in the second aspect of the present invention, the caulking portion is configured to sequentially provide the thin fillet portion an axial thickness of which is relatively thin and the thick fillet portion an axial thickness of which is relatively thick, in a peripheral direction of the shaft, and the radial length of the thin fillet portion is restricted to a predetermined length.

Therefore, the caulking strength in the thin fillet portion of the caulking portion can be improved.

In addition, since the thick fillet portion of the caulking portion accommodates the fillet movement from the thin fillet portion, the caulking strength can be increased.

Accordingly, the caulking strength can be maintained as a whole and occurrence of a crack can be prevented or restricted by eliminating or restricting the fillet movement to a radially outward side.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DETAILED DESCRIPTION OF THE EXAMPLE EMBODIMENT

Hereinafter, a switch device according to an embodiment of the present invention will be explained with reference to the accompanying drawings.

In the following embodiment, an object of performing restriction of crack occurrence while maintaining strength of caulking coupling is achieved by a fillet movement in a peripheral direction from a thin fillet portion to a thick filler portion.

First Embodiment

Figure 1:
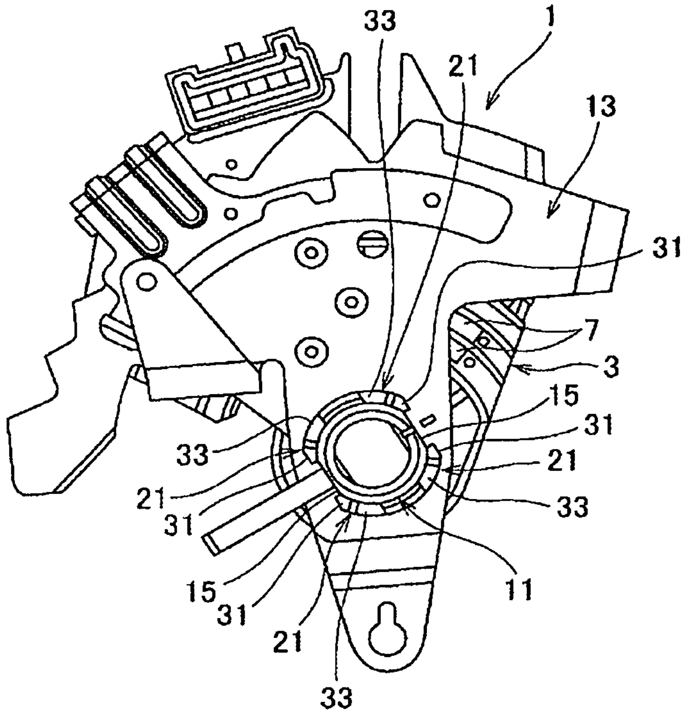
FIG. 1 is a plan view showing a transmission switch according to a first embodiment of the present invention.
Figure 2:
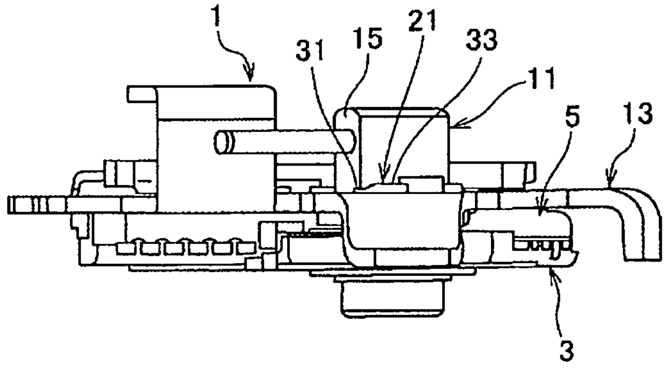
FIG. 2 is a side view showing the transmission switch according to the first embodiment of the present invention.
Figure 3:
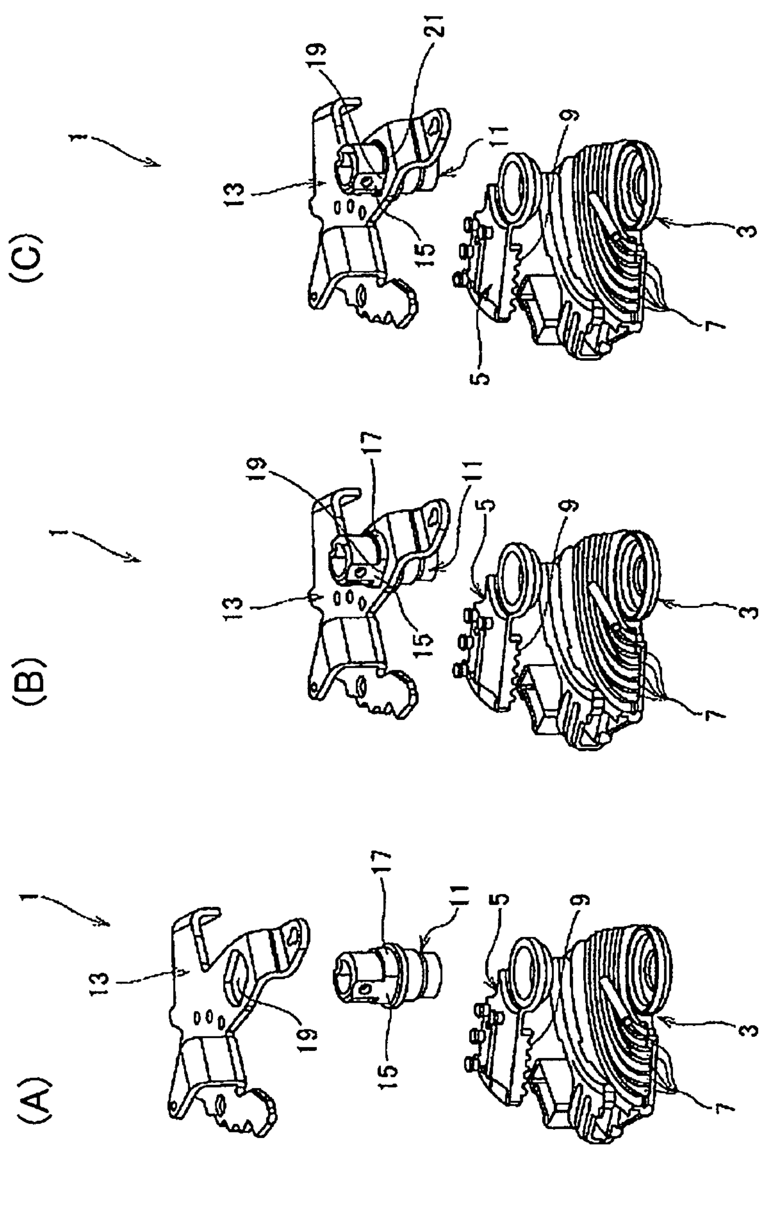
FIG. 3A is an exploded perspective view showing a state before fitting of a cylindrical member and a detent plate according to the first embodiment of the present invention.
FIG. 3B is an exploded perspective view showing a state after the fitting according to the first embodiment of the present invention.
FIG. 3C is an exploded perspective view showing a state after caulking coupling of the cylindrical member and the detent plate according to the first embodiment of the present invention.
Figure 4:
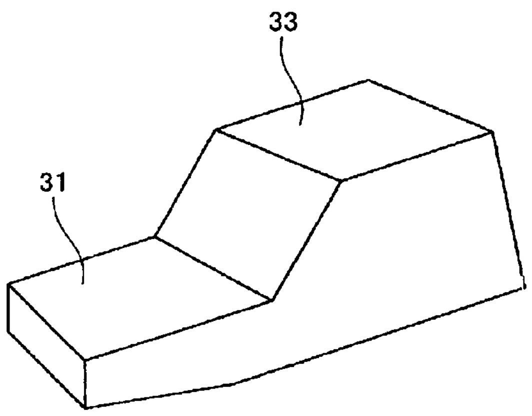
FIG. 4 is a perspective view showing a caulking portion according to the first embodiment of the present invention.

FIG. 1 to FIG. 3 show a first embodiment of the present invention. FIG. 1 is a plan view showing a transmission switch. FIG. 2 is a side view of the same. FIG. 3A is an exploded perspective view showing a state before fitting of a cylindrical member and a detent plate. FIG. 3B is an exploded perspective view showing a state after the fitting. FIG. 3C is an exploded perspective view showing a state after caulking coupling of the cylindrical member and the detent plate.

Figure 8:
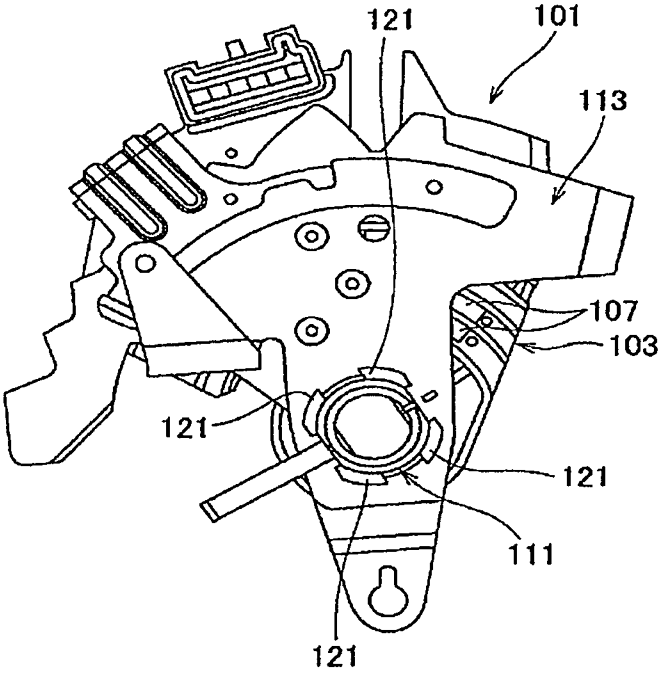
FIG. 8 is a plan view showing a transmission switch according to a conventional example.
Figure 9:
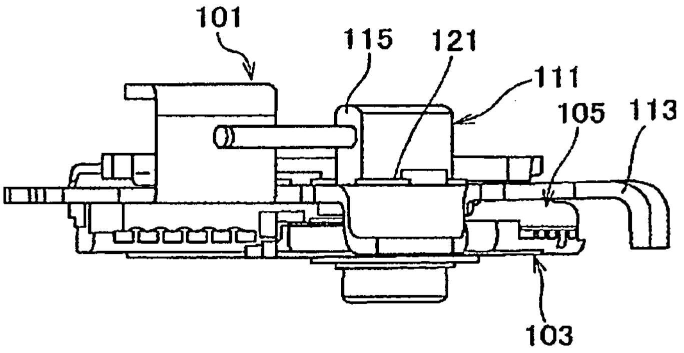
FIG. 9 is a side view showing the transmission switch according to the conventional example.
Figure 10:
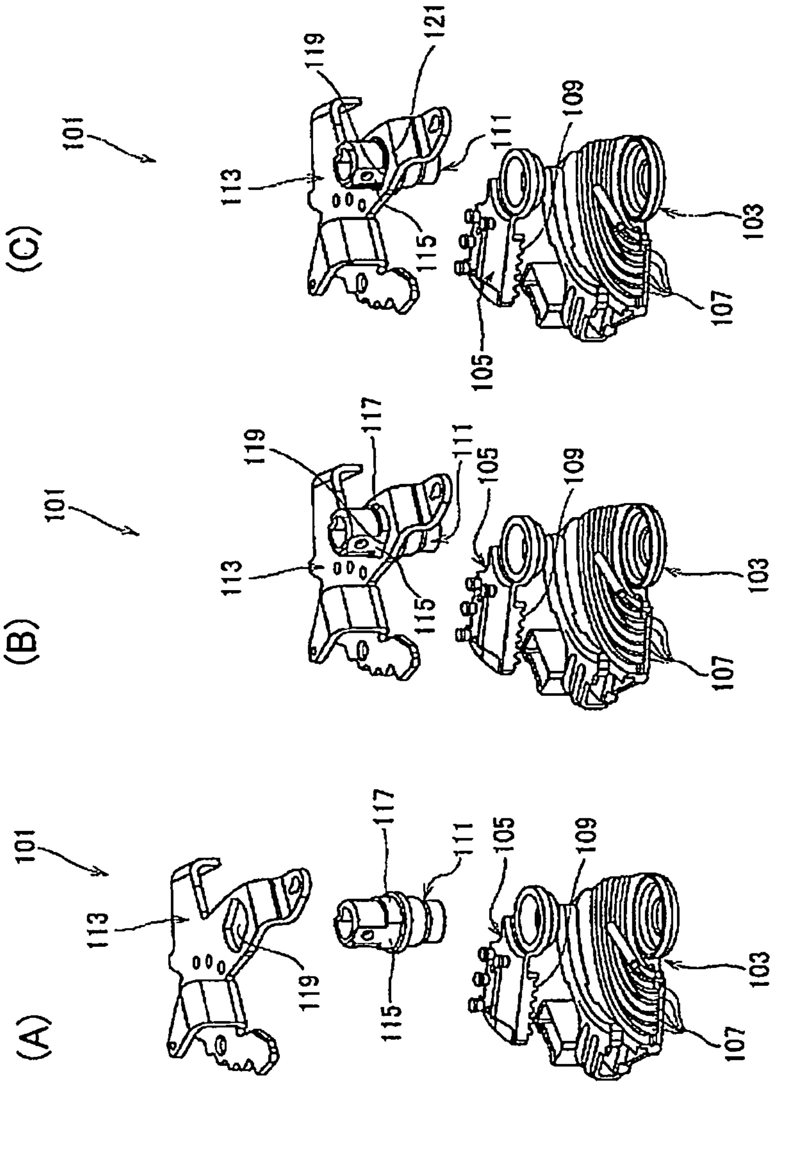
FIG. 10A is an exploded perspective view showing a state before fitting of a cylindrical member and a detent plate according to the conventional example.
FIG. 10B is an exploded perspective view showing a state after the fitting according to the conventional example.
FIG. 10C is an exploded perspective view showing a state after caulking coupling of the cylindrical member and the detent plate according to the conventional example.
Figure 11:
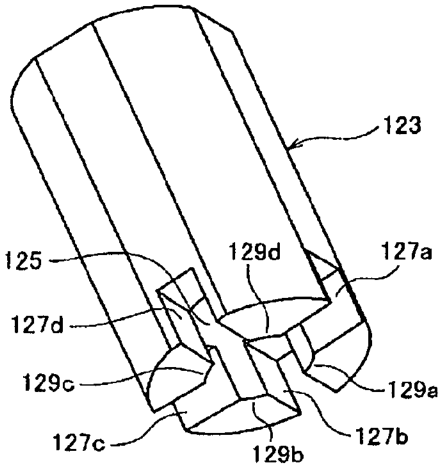
FIG. 11 is a perspective view showing a punch according to the conventional example.
Figure 12:
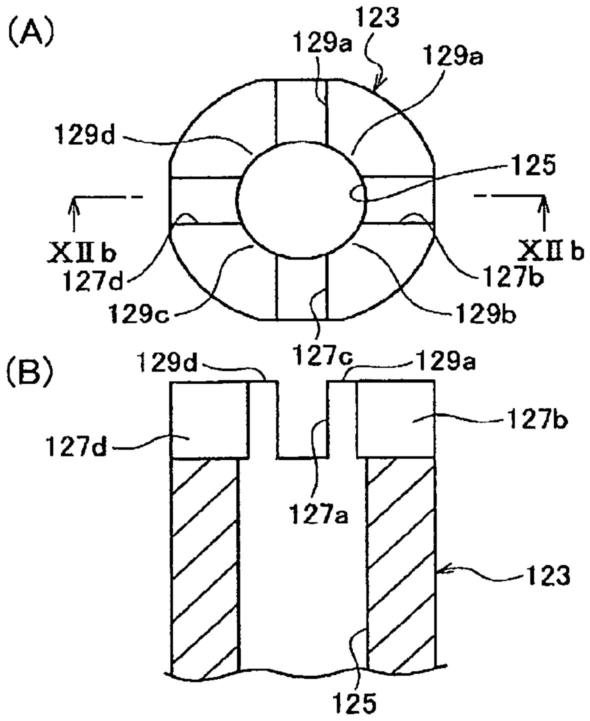
FIG. 12A is a front view showing the punch according to the conventional example.
FIG. 12B is a cross section taken in the direction of arrows on line XIIb-XIIb of FIG. 12A.

A basic structure of a transmission switch 1 shown in FIG. 1 to FIG. 3 is similar to a transmission switch 101 shown in FIG. 8 to FIG. 10 and differs in a structure of a caulking portion therefrom. Accordingly, in the transmission switch 1 shown in FIG. 1 to FIG. 3, components identical to those in the transmission switch 101 shown in FIG. 8 to FIG. 10 are referred to as codes found by eliminating number 100 from codes in FIG. 8 to FIG. 10 and the explanation is omitted. The caulking portion will be first explained.

A caulking potion 21 in the present embodiment is configured to sequentially provide a thin fillet portion 31 an axial thickness of which is relatively thin and a thick fillet portion 33 an axial thickness of which is relatively thick, in a peripheral direction of a cylindrical member 11 as a shaft, and a radial length of the thin fillet portion 31 is restricted to a predetermined length.

A caulking margin for forming the thin filler portion 31 is dimensioned to obtain a set caulking strength. For example, the caulking portion is caulked with a caulking margin similar to that of the conventional caulking portion.

A part of the thick filler portion 33 is formed based upon filler movement caused by caulking the thin filler portion 31. That is, the thick fillet portion 33 is caulked with a caulking margin smaller than the thin filler portion 31, and is formed by the filler directly punched with a smaller caulking margin of the punch and the filler moved in a peripheral direction from the thin filler portion 31.

Figure 5:
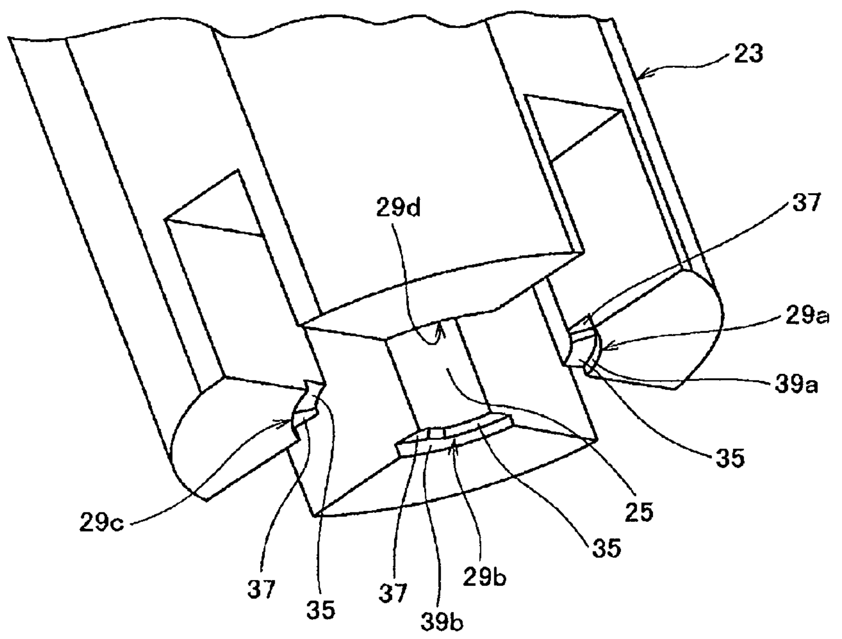
FIG. 5 is a partially enlarged perspective view showing a punch according to the first embodiment of the present invention.
Figure 6:
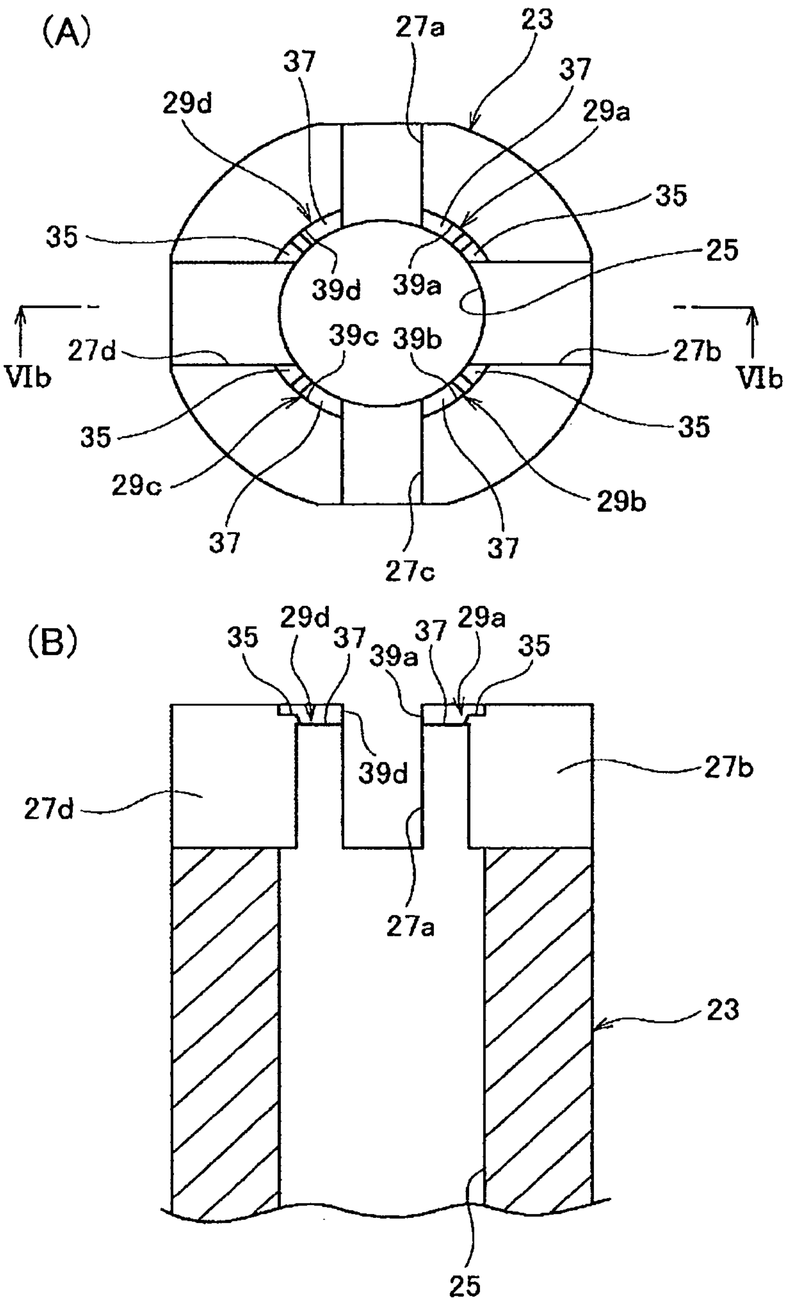
FIG. 6A is a front view showing the punch according to the first embodiment of the present invention.
FIG. 6B is a cross section taken in the direction of arrows on line VIb-VIb of FIG. 6A.

The caulking process of the caulking portion 21 is executed by the punch as shown in FIG. 5 and FIG. 6. FIG. 5 is a partially enlarged perspective view showing the punch. FIG. 6A is a front view showing the punch. FIG. 6B is a cross section taken in the direction of arrows on line VIb-VIb of FIG. 6A;

A punch 23 is formed in a cylindrical shape and has a fitting bore 25 formed in the center, which is fitted in the cylindrical member 11. The punch 23 has four caulking surfaces 29*a*, 29*b*, 29*c* and 29*d* formed in a tip end portion by four slits 27*a*, 27*b*, 27*c* and 27*d*. Each of the four caulking surfaces 29*a*, 29*b*, 29*c* and 29*d* is configured by a stepped plane.

That is, each of the caulking surfaces 29*a*, 29*b*, 29*c* and 29*d* is configured by sequentially peripherally forming first and second caulking surfaces 35 and 37 each having a caulking margin which axially differs in depth. The shallow, first caulking surface 35 of the punch 23 has a caulking margin greater than that of the deep, second caulking surface 37. The shallow, first caulking surface 35 corresponds to the deep caulking margin and the deep, second caulking surface 37 corresponds to the shallow caulking margin.

In the first and second caulking surfaces 35 and 37, regulating surfaces 39*a*, 39*b*, 39*c* and 39*d* opposing the outer peripheral surface of the caulking process portion 17 each are provided across both of the first and second caulking surfaces 35 and 37. It should be noted that, considering that a crack tends to be easily generated at the thin filler portion 31 in the caulking portion 21, it is possible to form the regulating surfaces 39*a*, 39*b*, 39*c* and 39*d* each at least at the first caulking surface 35 as one side having a larger (deeper) caulking margin.

The regulating surfaces 39*a*, 39*b*, 39*c* and 39*d* regulate the radial fillet movement by the caulking of the caulking process portion 17 and promote the filler movement to the side of the second caulking surface 37 as the other of the first and second caulking surfaces 35 and 37, which is smaller (shallower) in caulking margin.

Figure 7:
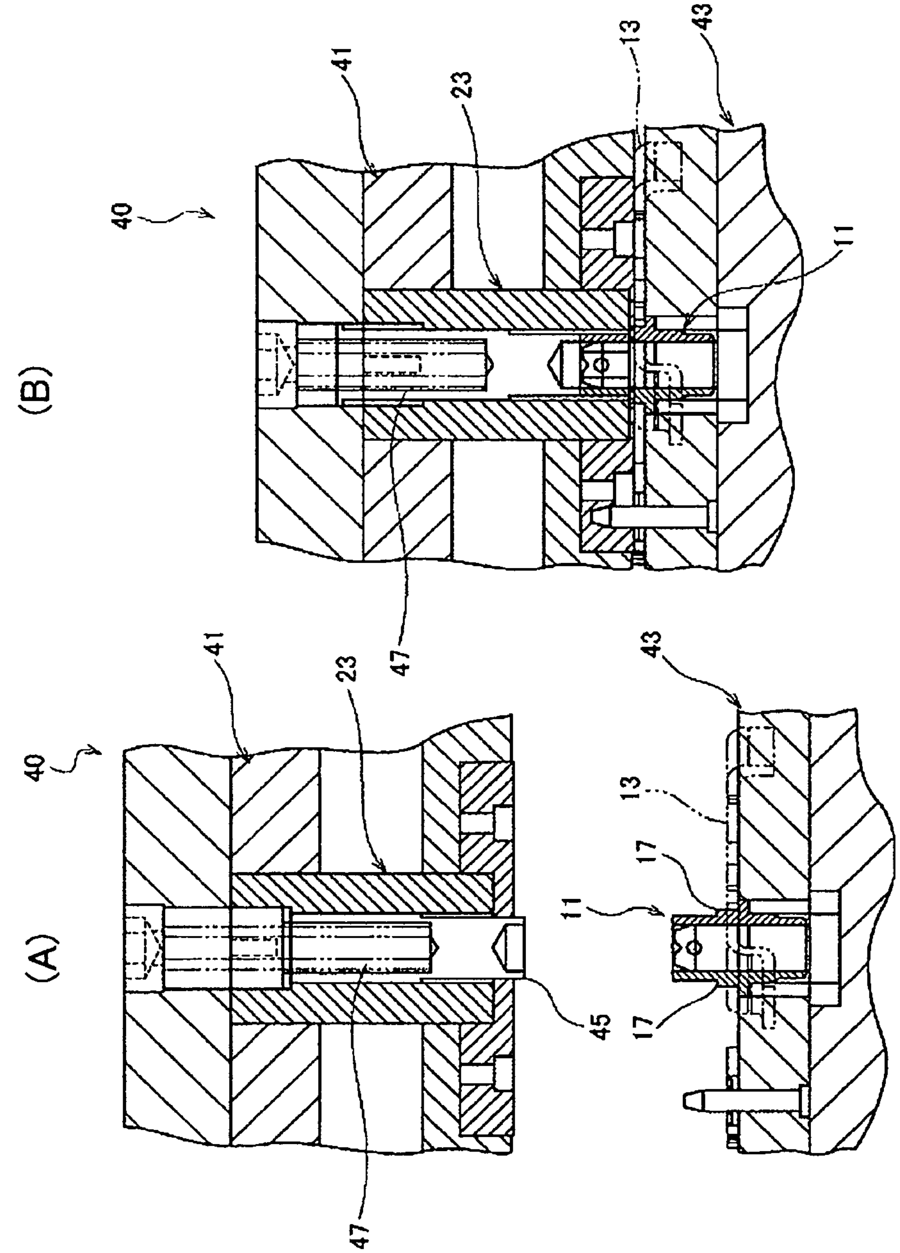
FIG. 7A is a partial cross section showing a state where upper and lower molding tools are separated according to the first embodiment of the present invention.
FIG. 7B is a partial cross section showing a state of caulking process by upper and lower molding tools according to the first embodiment of the present invention.

Such a punch 23 is mounted to a caulking coupling device 40 shown in FIG. 7 and the caulking is performed with a set caulking margin to form the stepped caulking portion 21 as shown in FIG. 1 and FIG. 2, thus performing the caulking coupling.

FIG. 7A is a partial cross section showing a state where upper and lower molding tools are separated; and FIG. 7B is a partial cross section showing a state of caulking process by upper and lower molding tools.

As shown in FIG. 7A and FIG. 7B, the caulking coupling device 40 is composed of an upper die 41 and a lower die 43. The punch 23 is mounted to the upper die 23. A forward and backward member 45 in the upper die 41 is urged in a forward direction by a coil spring 47 to contact against the lower die 43, and goes backward in the punch 23.

The cylindrical member 11 is mounted to the lower die 43, portions of width across flat portions 15 of the cylindrical member 11 are formed as shaft-shaped fitting portions of the first member provided with the caulking process portions 17, and the bore portion 19 of the detent plate 13 as the second member is fitted in the fitting portions.

In addition, by carrying downward the upper die 41 from the separation state in FIG. 7A by a hydraulic drive device or the like, a punch operation is performed as shown in FIG. 7B.

The caulking process portion 17 can be caulked based upon such a punch operation by the punch 23 to securely form the stepped caulking portion 21 as shown in FIG. 1 and FIG. 2.

Effect of the First Embodiment

According to the caulking coupling device 40 in the embodiment of the present invention, the caulking coupling device 40 comprises the cylindrical member 11 including a shaft-shaped fitting portion and provided with a caulking process portion 17 on an outer periphery of the shaft-shaped fitting portion, the detent plate 13 having the bore portion 19 fitted in the shaft-shaped fitting portion of the cylindrical member 11, and the punch 23 having the caulking surfaces 29*a*, 29*b*, 29*c*, and 29*d* to the caulking process portion 17, wherein the caulking process portion 17 is caulked to an edge portion of the bore portion 19 with a predetermined caulking margin by the caulking surfaces 29*a*, 29*b*, 29*c*, and 29*d* of the punch 23 to couple the cylindrical member 11 to the detent plate 13 by caulking, wherein the punch 23 includes the first caulking surface 35 and the second caulking surface 37 the caulking margins of which axially differ in depth and sequentially formed in a peripheral direction and includes the regulating surfaces 39*a*, 39*b*, 39*c* and 39*d* opposing an outer peripheral surface of the caulking process portion 17 to be across both of the first and second caulking surfaces, wherein the regulating surfaces 29*a*, 29*b*, 29*c*, and 29*d* regulate radial fillet movement by caulking of the caulking process portion 17 and promote the fillet movement to the second caulking surface 37 of the first and second caulking surfaces 35 and 37, which has a less deep caulking margin.

Accordingly, it is possible to regulate the fillet spread of the thin fillet portion 31 having the thickness of the caulking portion 21 which is relatively thin, in a radial direction of the cylindrical member 11.

Therefore, a caulking strength in the thin fillet portion 31 of the caulking portion 21 can be improved and it is possible to prevent or restrict the crack occurrence.

Further, since the thick fillet portion 33 of the caulking portion 21 accommodates the fillet movement from the thin fillet portion 31, the thick fillet portion 33 is shallow in caulking margin but is in a state of being caulked with a caulking margin greater than a set caulking margin, and the caulking strength can be increased.

Accordingly, the caulking strength can be maintained as a whole and occurrence of a crack can be prevented or restricted by eliminating or restricting the fillet movement to a radially outward side of the thin fillet portion 31.

According to the transmission switch 1 in the embodiment of the present invention, the transmission switch 1 comprises the cylindrical member 11 provided with the caulking process portion 17 on an outer periphery thereof, and the detent plate 13 having the bore portion 19 fitted in the cylindrical member 11, wherein the caulking process portion 17 is caulked to an edge portion of the bore portion 19 with a predetermined caulking margin to form the caulking portion 21 to the detent plate 13 and to couple the cylindrical member 11 to the detent plate 13 by caulking, wherein the caulking portion 21 is configured to sequentially provide the thin fillet portion 31 an axial thickness of which is relatively thin and the thick fillet portion 33 an axial thickness of which is relatively thick, in a peripheral direction of the cylindrical member 11, and the thick filler portion 33 can be formed based upon the filler movement by the caulking of the thin filler portion 31.

Therefore, a caulking strength in the thin fillet portion 31 of the caulking portion 21 can be improved and it is possible to prevent or restrict the crack occurrence.

Further, since the thick fillet portion 33 of the caulking portion 21 accommodates the fillet movement from the thin fillet portion 31, the caulking strength can be increased.

Accordingly, the caulking strength can be maintained as a whole and occurrence of a crack can be prevented or restricted by eliminating or restricting the fillet movement to a radially outward side.

The caulking potion 21 is configured to sequentially provide the thin fillet portion 31 an axial thickness of which is relatively thin and the thick fillet portion 33 an axial thickness of which is relatively thick, in a peripheral direction of the cylindrical member 11, and the radial length of the thin fillet portion 31 is restricted to a predetermined length.

Therefore, the caulking strength can be improved at the thin filler portion 31 in the caulking portion 21.

Further, a component caulked to the detent plate 13 may be a manual shaft moving in cooperation with an operation of the shift lever instead of the cylindrical member 11.

The present invention can be applied to a switch to which a movable board having a slider in the cylindrical member 11 or the manual shaft is caulked.

While only the selected embodiment has been chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

DESCRIPTION OF THE CODES

1: TRANSMISSION SWITCH
11: CYLINDRICAL MEMBER (FIRST MEMBER, SHAFT)
13: DETENT PLATE (SECOND MEMBER)
17: CAULKING PROCESS PORTION
19: BORE PORTION
21: CAULKING PORTION
23: PUNCH
**29*a*, 29*b*, 29*c*, 29*d***: CAULKING SURFACE
31: THIN FILLER PORTION
33: THICK FILLER PORTION
35, 37: FIRST, SECOND CAULKING SURFACE
**39*a*, 39*b*, 39*c*, 39*d***: REGULATING SURFACE
40: CAULKING COUPLING DEVICE

What is claimed is:

1. A switch comprising:

a shaft provided with a caulking process portion on an outer periphery thereof, the outer periphery of the shaft having a pair of opposing flat portions and an opposing pair of arcuate portions to form a racetrack configuration as viewed in plan view; and a movable board having a bore portion fitted on the shaft, wherein the caulking process portion is caulked to an edge portion of the bore portion with a predetermined caulking margin to form a caulking portion to the movable board and to couple the shaft to the movable board by caulking, wherein:

the caulking portion is configured to sequentially provide at least one thin fillet portion, an axial thickness of which is relatively thin, and at least one thick fillet portion, an axial thickness of which is relatively thick, in a peripheral direction of the shaft, wherein the at least one thick fillet portion is formed as an integral construction with one of the pair of arcuate portions of the shaft and extends partially therealong in the peripheral direction, wherein the at least one thin fillet portion is formed as an integral construction with the same one of the pair of arcuate portions and the at least one thick fillet portion, and wherein the at least one thin fillet portion extends along the same one of the pair of arcuate portions from the at least one thick fillet portion in the peripheral direction to terminate at one of the pair of opposing flat portions.

2. A transmission switch for the switch according to claim 1, wherein:

the shaft includes a manual shaft in an automatic transmission; and the movable board includes a detent plate in the automatic transmission.

* * * * *